(12) United States Patent
Zoch

(10) Patent No.: US 11,151,761 B2
(45) Date of Patent: Oct. 19, 2021

(54) ANALYSING INTERNET OF THINGS

(71) Applicant: SAP SE, Walldorf (DE)

(72) Inventor: Daniel Zoch, Walldorf (DE)

(73) Assignee: SAP SE, Walldorf (DE)

( * ) Notice: Subject to any disclaimer, the term of this patent is extended or adjusted under 35 U.S.C. 154(b) by 795 days.

(21) Appl. No.: 14/870,018

(22) Filed: Sep. 30, 2015

(65) Prior Publication Data
US 2017/0091277 A1  Mar. 30, 2017

(51) Int. Cl.
*G06T 11/20* (2006.01)
*G06F 16/248* (2019.01)
*G06F 16/242* (2019.01)

(52) U.S. Cl.
CPC .......... *G06T 11/206* (2013.01); *G06F 16/248* (2019.01); *G06F 16/2423* (2019.01)

(58) Field of Classification Search
None
See application file for complete search history.

(56) References Cited

U.S. PATENT DOCUMENTS

| | | | | |
|---|---|---|---|---|
| 9,467,515 | B1 * | 10/2016 | Penilla ................. | G06F 3/04842 |
| 2013/0320078 | A1 * | 12/2013 | Hobbs .................... | G06Q 10/10 |
| | | | | 235/375 |
| 2014/0002265 | A1 * | 1/2014 | Carnes ................... | G16H 40/63 |
| | | | | 340/573.1 |
| 2015/0269624 | A1 * | 9/2015 | Cheng ................ | G06Q 30/0267 |
| | | | | 705/14.58 |
| 2015/0324900 | A1 * | 11/2015 | Starikova ............... | G06Q 40/02 |
| | | | | 705/35 |
| 2016/0092572 | A1 * | 3/2016 | Venkata ............ | G06F 16/24534 |
| | | | | 707/709 |
| 2017/0085445 | A1 * | 3/2017 | Layman ................ | H04L 43/045 |
| 2017/0169339 | A1 * | 6/2017 | Dalmia .................. | G06N 5/025 |
| 2018/0084073 | A1 * | 3/2018 | Walsh ................. | H04L 67/2819 |

* cited by examiner

*Primary Examiner* — Alford W Kindred
*Assistant Examiner* — Soheila (Gina) Davanlou
(74) *Attorney, Agent, or Firm* — Buckley, Maschoff & Talwalker LLC

(57) ABSTRACT

Various embodiments of systems and methods for internet of things (IoT) data analysis are described herein. In an aspect, the method includes receiving user's input for data fields which are configured for retrieving data from a data repository. The data repository stores data related to one or more IoT devices. A structured query language (SQL) statement corresponding to the received user's input is generated. Based upon the generated SQL statement, data from the data repository is retrieved. A visual representation for displaying the retrieved data is identified. The retrieved data is rendered based upon the identified visual representation.

21 Claims, 8 Drawing Sheets

ANALYSING INTERNET OF THINGS

BACKGROUND

Internet of Things (IoT) is a network of physical objects or devices (i.e., "things") communicatively connected to exchange data with users and/or each other. Usually, IoT data are organized using data models created by developers. Different customers prefer different data models for structuring and organizing IoT data. Developers need to be informed to modify data models based upon customers' requirements which is a time consuming and arduous task. Further, analyzing IoT data and retrieving required IoT data from data repositories require expertise knowledge and training.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments may be best understood from the following detailed description taken in conjunction with the accompanying drawings.

DESCRIPTION

Figure 1:
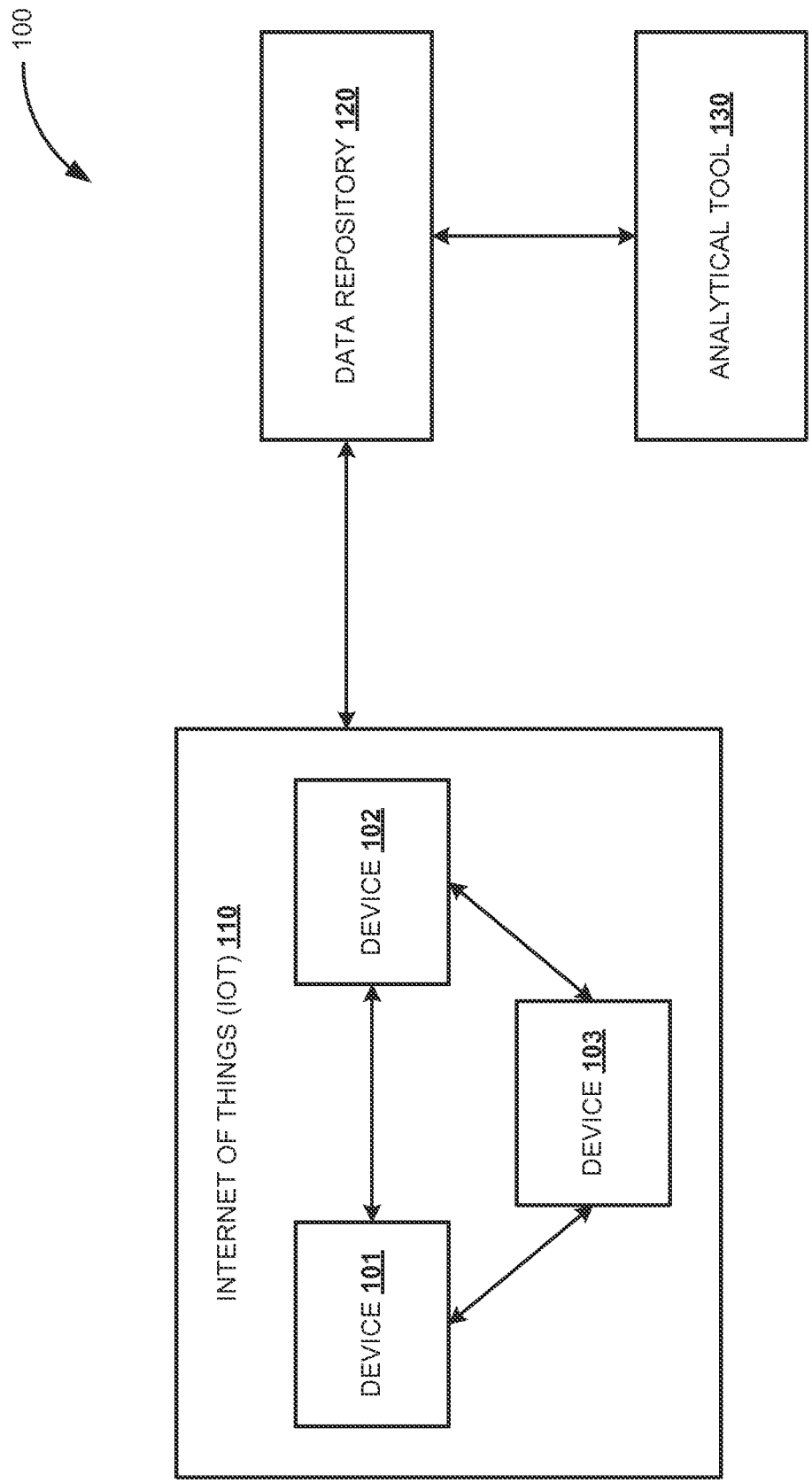
FIG. 1 is a block diagram illustrating an exemplary data analysis environment of Internet of Things (IoT), according to an embodiment.

Embodiments of techniques for analyzing Internet of Things are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

"Business application" refers to software or a set of computer programs that are used to perform various business functions. For example, a business application may be used to measure productivity and perform business functions accurately. The business application may be interactive, i.e., they have a graphical user interface through which a user can query, modify, and input data and also analyze results instantaneously.

"Device" or "Thing" refers to a logical and/or a physical unit adapted for a specific purpose. For example, a device may be at least one of a mechanical and/or an electronic unit. Device encompasses, but is not limited to, a communication device, a computing device, a handheld device, and a mobile device such as an enterprise digital assistant (EDA), a personal digital assistant (PDA), a tablet computer, a smartphone, and the like. A device can perform one or more tasks. The device includes computing system comprising electronics (e.g., sensors) and software. The device is uniquely identifiable through its computing system. The device can access interact services such as World Wide Web (www) or electronic mails (E-mails), and exchange information with another device or a server by using wired or wireless communication technologies, such as Bluetooth, Wi-Fi, Universal Serial Bus (USB), infrared and the like.

"Internet of Things" or IoT refers to a network of devices or "things" connected to exchange data with users and/or other connected devices. The IoT enables transfer or exchange of data over a network without requiring human-to-human interaction. Data is created or collected by a device. For example, a sensor may collect engine temperature data of an automobile. Amount of data exchanged through IoT (i.e., IoT data is voluminous, e.g., real time data in cloud environment. The data may be time-stamped (e.g., time series data) and/or geo location stamped data. The data may be received from the device in real-time or predefined time intervals.

"IoT application" refers to a subset of business application which helps a user to query, modify, and analyze the collected or stored IoT data. The IoT application includes one or more graphical user interfaces through which query can be entered and results can be analyzed instantaneously.

"Data model" refers to representation of data. A data model is used for structuring and organizing data and for displaying relationship(s) between data. A user (e.g., customer or end user) can design, create, modify, or update data model based upon dynamic requirement(s) of structuring and organizing data. The data model may be created based upon input (e.g., data fields or metadata) received from the user. The user's input may be received through graphical user interface(s). Once the input is received, the data model is created and at least one database table is automatically created in a backend for storing data. Required data may be retrieved from the database table. The data may be retrieved for further processing, generating reports, or analysis, etc. The analysis may be a predictive analysis for future prediction or a current status analysis for getting insight into a current situation.

"Analytical tool" refers to a tool which enables a user to configure data model and retrieve data from a data repository including the database tables. The user can provide instruction to the analytical tool to retrieve required data from the data repository. The user can provide the instruction in natural or ordinary language such as English. For example, the user may provide instruction such as "alert me when a temperature of machine X is higher than 30° C." or "display current average speed of my car." The instruction may be provided through user interfaces (UIs) of the analytical tool. Based upon the instruction, the analytical tool creates analytical function (e.g., logical statement or structured query language (SQL) query to retrieve requested data from the data repository. The analytical tool automatically converts the instruction into SQL query to retrieve the required data from the data repository.

"Analytical visualization" refers to UI section of analytical tool through which an instruction or command can be provided for retrieving required data. The analytical visualization comprises data fields such as, but not limited to, "pattern," "object," "property," and "visualization." "Object" refers to device or thing (e.g., car) forming the IoT and having at least one "property" (e.g., speed) which can be analyzed, "pattern" refers to feature related to a property (e.g., current average speed) which user wants to analyze, and "visualization" refers to visual template (e.g., bar chart) in which the "pattern" can be represented or displayed to the user. Values for corresponding data field (e.g., pattern, object, property, and visualization) may be provided or selected from their respective dropdown menus. A dropdown menu is populated with predefined values for a corresponding data field. For example, the dropdown menu for the data field "pattern" may have predefined values such as current average speed, current temperature, etc., the dropdown menu for the data field "object" may have predefined values like car, truck, bike, motor, etc., the dropdown menu for the data field "property" may have predefined values corresponding to the selected "object" (e.g., car) such as speed, motor temperature, etc., the dropdown menu for the data field "visualization" may have predefined values such as KM, bar chart, pie diagram, number, etc.

"View" refers to a result set of a database query. It can be referred as a subset of the database. For example, a view including IDs of all machines whose (temperature is above 30° C. is created on the top of the database table storing machines information. In an embodiment, prior to generation of "visualization," various views corresponding to the "visualization" and/or "pattern" is generated.

"Data repository" refers to a storage comprising: one or more database tables storing data related to the IoT devices; one or more data models generated for IoT data; one or more "visualizations" generated from the stored IoT data; one or more "patterns" predefined for IoT devices; and one or More views created for the IoT data.

FIG. 1 is a block diagram illustrating exemplary data analysis environment 100 for monitoring and analyzing Internet of Things (IoT) 110. The data analysis environment 100 includes a data repository 120 for storing data related to the IoT 110 and analytical tool 130 for retrieving required data from the data repository 120. The IoT 110 comprises devices 101-103 which can be monitored or analyzed. For example, the devices 101-103 may be cars. A device includes a computing system comprising electronics and software. The device is uniquely identifiable through its computing system. The computing system of the device is communicatively connected to the data repository 120. The data repository 120 receives data from the computing system of the IoT devices 101-103. The data may be received real-time or at predefined time intervals. The data stored in data repository 120 may be analyzed through the analytical tool 130. A user, e.g., an end user or customer may analyze the data through the analytical tool 130. The user may provide instruction to the analytical tool 130 in natural language such as English. The analytical tool 130 converts the user's instruction into logical statement such as a structured query language (SQL) query to retrieve the required data from the data repository 120 based upon the instruction.

IoT device (e.g., devices 101-103) may be any physical device including a mechanical and/or an electronic unit. The IoT device encompasses, but is not limited to, a communication device, a computing device, a handheld device, a mobile device, and a mechanical device such as a car and the like. The IoT device is uniquely identifiable, e.g., through it's computing system. For example, the computing system includes unique device identification number for identifying the IoT device. The IoT device can access Internet services and exchange information with other devices and/or a server by using wired or wireless technologies. The IoT devices 101-103 may be installed with one or more sensors to measure one or more properties of the IoT device. A sensor may be communicatively connected to the data repository 120. The data collected by the sensor, e.g., engine temperature data of an automobile or a car is communicated to the data repository 120. The data repository 120 may be included within a server. The data repository 120 may be updated with data in real-time or at predefined time intervals. The data may be time-stamped (e.g., time series data) and/or geo location stamped. The data to be collected or communicated to the data repository 120 may be specified by the user.

The data repository 120 may be structured or defined by the user, e.g., the end user or the customer. The user defines metadata for the data repository 120. The metadata may refer to the information related to columns of a database table of the data repository 120. For example, a type of data (numerical, alphabetical, etc.) that a column can have, minimum and maximum data count that a column can have, etc. The user may define the metadata based upon the data which user wants to analyze. The user defines the metadata through the analytical tool 130. The analytical tool 130 may include one or more UIs for defining metadata for the data repository 120. Based upon the defined metadata, the data repository 120 including database table is structured (e.g., data fields for the database table are created). The data repository 120 is created automatically in a backend. Once the data repository 120 is created, a connection is established between the data repository 120 and the IoT devices, e.g., devices 101-103. The IoT devices (e.g., devices 101-103) whose data is to be collected in the data repository (e.g., data repository 120) may be selected by the user. The data (e.g., data specified by the metadata) is collected from the IoT devices. In an embodiment, the data may be collected from the sensors in the IoT devices. The collected or received data is stored in the data repository 120.

Figure 2:
FIG. 2 illustrates a database table for IoT devices, according to an embodiment.

FIG. 2 shows database table 200 created within the data repository 120 for IoT devices such as cars. The database table 200 may be created by an employee of a car rental company. The employee may define the metadata to create the database table 200. The database table 200 includes data fields such as CAR_ID 210 (unique identifier of a car based upon its computing system), TIME 220 (real time stamp at which the data is collected), ENGINE_TEMP 230 (temperature of car's engine), SPEED 240 (current speed of car), and FUEL 250 (amount of fuel available in car). The dynamic data fields whose value may change with time such as TIME 220, ENGINE_TEMP 230, SPEED 240, and FUEL 250 may be updated in real-time. In an embodiment, the engine temperature (ENGINE_TEMP 230), a car speed (SPEED 240), and car fuel (FUEL 250) values are received or collected from one or more sensors (e.g., temperature sensor, speed sensor, fuel sensor, etc.) implanted in the car. The sensors are in direct communication with the server including the database table 200. The database table 200 may be updated automatically in real-time. The server may be a private server of the car rental company, car repair station, manufacturer, etc.

The user can retrieve the desired data from the data repository (e.g., database table 200) of the server. The user (e.g., customer) can provide instruction through the analytical tool 130 to retrieve the desired data from the database table 200. The user can compose the command or instruction in natural or ordinary language such as English. For example, the user may provide instruction such as "display current average speed of my cars" into the analytical tool 130. In an embodiment, the analytical tool 130 includes UI section namely "analytical visualization" through which the instruction or command can be provided for retrieving required data.

Figure 3:
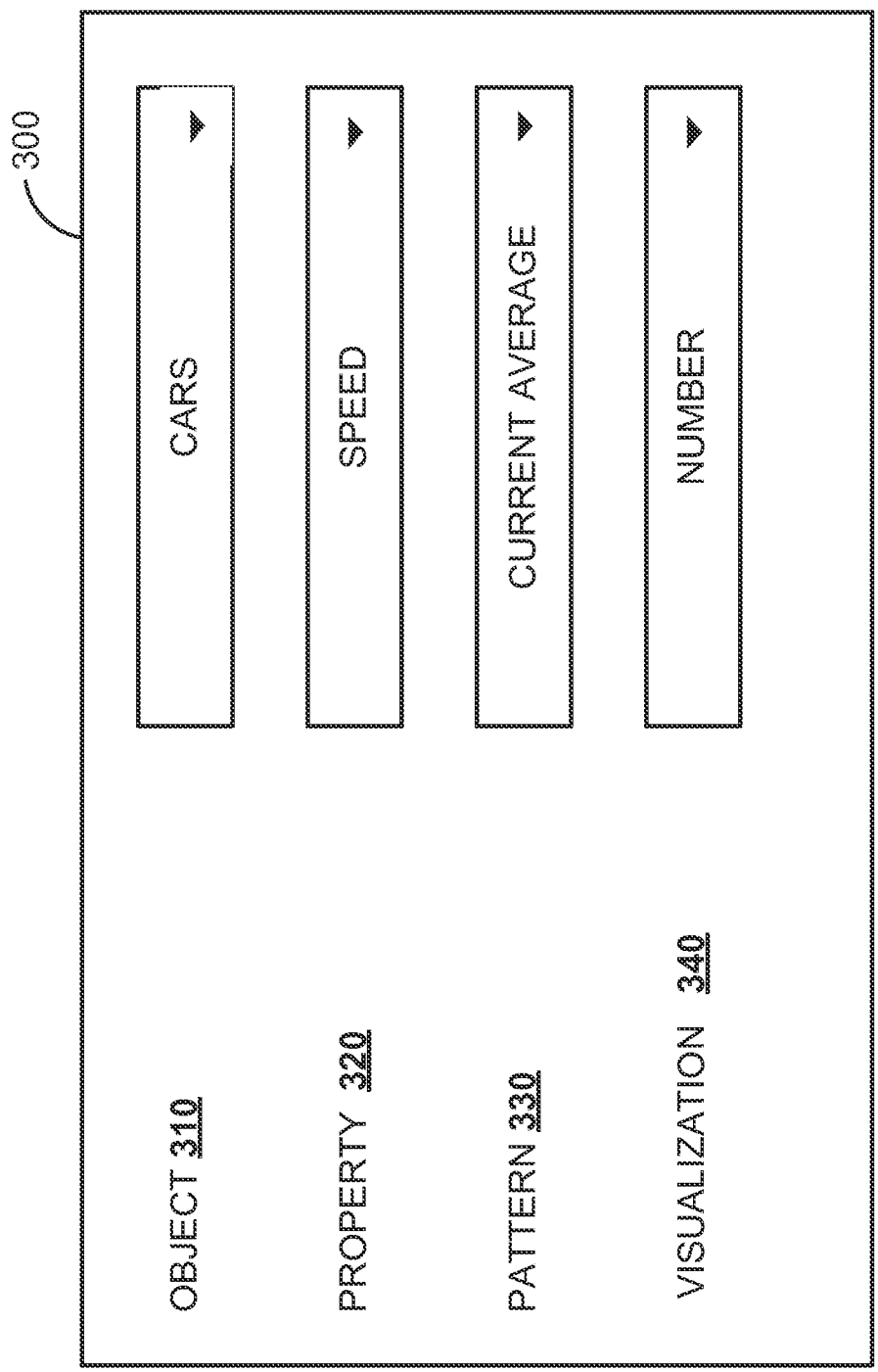
FIG. 3 illustrates a user interface for retrieving data from the database table, according to an embodiment.

FIG. 3 shows a user interface 300 included within the analytical tool 130. The user interface 300 comprises data fields OBJECT 310, PROPERTY 320, PATTERN 330, and VISUALIZATION 340. OBJECT 310 refers to device or thing (e.g., car) comprising the IoT, PROPERTY 320 refers to a "property" (e.g., speed) associated with the OBJECT 310 which can be analyzed, PATTERN 330 refers to feature related to the property (e.g., "current average" related to the property "speed") which user wants to analyze, and VISUALIZATION 340 refers to visual template (e.g., bar chart, pie chart, or number, etc.) in which the value of the PATTERN (i.e., current average value) is displayed to the user. Values for corresponding data field may be provided or selected from their respective dropdown menus. The dropdown menu is populated with predefined values for corresponding data fields. The user selects the values e.g., 'CARS,' 'SPEED,' 'CURRENT AVERAGE,' and 'NUMBER' corresponding to the data fields OBJECT 310, PROPERTY 320, PATTERN 330, and VISUALIZATION 340, respectively.

Once the values (i.e., instructions) are provided, the analytical tool 130 automatically creates a logical statement (e.g., SQL query) corresponding to the provided values. For example, the SQL query: "SELECT AVG (speed) FROM cars WHERE time=now" is created by the analytical tool 130. Based upon the SQL query, the required data is retrieved from the database table 200 (FIG. 2). For example, the average speed of cars (e.g., 115 km/hr) is calculated and displayed. The average speed of the cars is displayed in the format (e.g., "NUMBER") selected or specified by the user through the dropdown menu of the data field VISUALIZATION 340.

Figure 4:
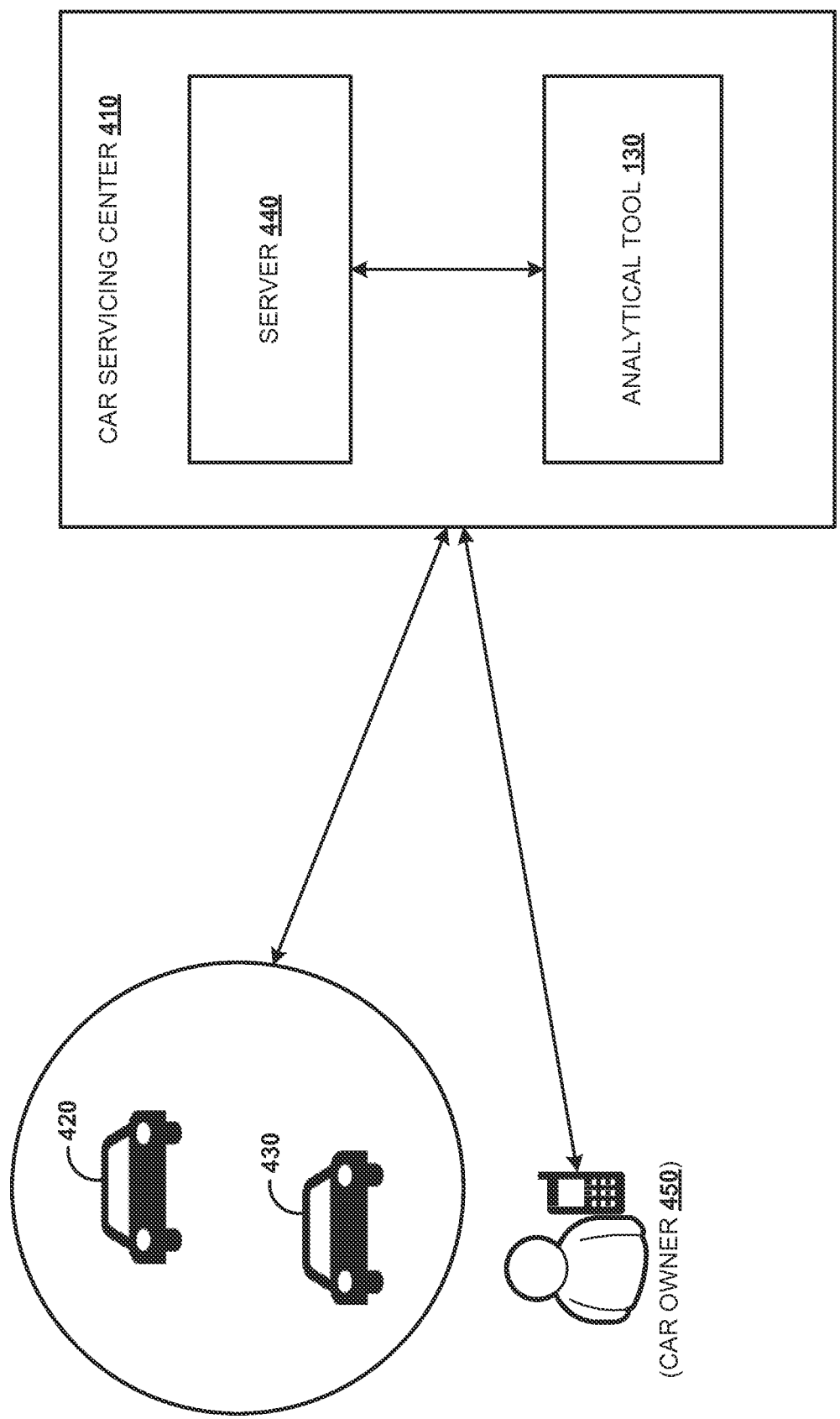
FIG. 4 illustrates a car servicing center for monitoring and analyzing Internet of Things (IoT) comprising cars, according to an embodiment.

FIG. 4 shows a car servicing center 410 which monitors and analyzes its registered cars, e.g., cars 420-430. The car servicing center 410 is communicatively connected to its registered cars 420-430. The cars 420-430 include one or more sensors which communicates directly to the car servicing center 410 (e.g., by sending measured IoT sensor data). The car servicing center 410 includes a server 440 which collects and stores IoT data (e.g., car speed, engine temperature, etc.) received from the one or more sensors of the registered cars 420-430. The data may be stored within a data repository (e.g., data repository 120 of FIG. 1) included within the server 440. The data stored in the server 440 can be analyzed by the analytical tool 130 installed in the car servicing center 410. In an embodiment, the data stored in the server 440 may be analyzed by the user through the analytical tool 130.

In an embodiment, the analytical tool 130 may include one or more predefined conditions. Based upon the one or more predefined conditions, the analytical tool 130 analyzes the data repository to determine whether the one or more predefined conditions are satisfied. In an embodiment, for determining whether the one or more predefined conditions are satisfied, one or more views may be created and various mathematical and/or logical operations may be performed on the one or more created views to determine whether the predefined condition is satisfied. In an embodiment, multiple views are created for determining whether the one or more predefined conditions are satisfied. When multiple views are created, the mathematical and/or logical operations are performed in parallel upon the multiple views to determine if the one or more predefined conditions are satisfied. When the one or more predefined conditions are satisfied, the analytical tool 130 automatically sends alert.

For example, the predefined condition may be to generate an alert for the cars whose engine temperature is equal to or greater than 90° C. Based upon the stated predefined condition, the analytical tool 130 checks the data repository (e.g., database table 200 of FIG. 2) and generates a view comprising a single column and three rows in tabular format. The rows include engine temperature (e.g., 90° C., 20° C., and 50° C.) of respective car, i.e., car with ID 1, 2, and 3. Once the view is created, a function "equal to or greater than 90° C." is applied on the generated view. Upon applying the function on the generated view, a new view comprising a single row and a single column including the engine temperature (90° C.) for the car with CAR_ID 1 is created. Thereafter, an alert is generated or displayed for car with CAR_ID 1. As discussed, views are generated and manipulated to perform various logical and/or mathematical operations without modifying the database (e.g., the database table 200 of FIG. 2).

In another embodiment, the user dynamically instructs (e.g., provide condition) for retrieving and displaying the desired data (e.g., alerts) and the analytical tool 130 retrieves and displays the desired data per user's instruction. Based upon the displayed alerts, the car servicing center 410 may contact the respective car owner, e.g., car owner 450, for servicing the car/engine. In an embodiment, an alert is sent automatically to the car owner 450, e.g., on their mobile phone. Therefore, the car servicing can be provided on a need or requirement basis.

Figure 5:
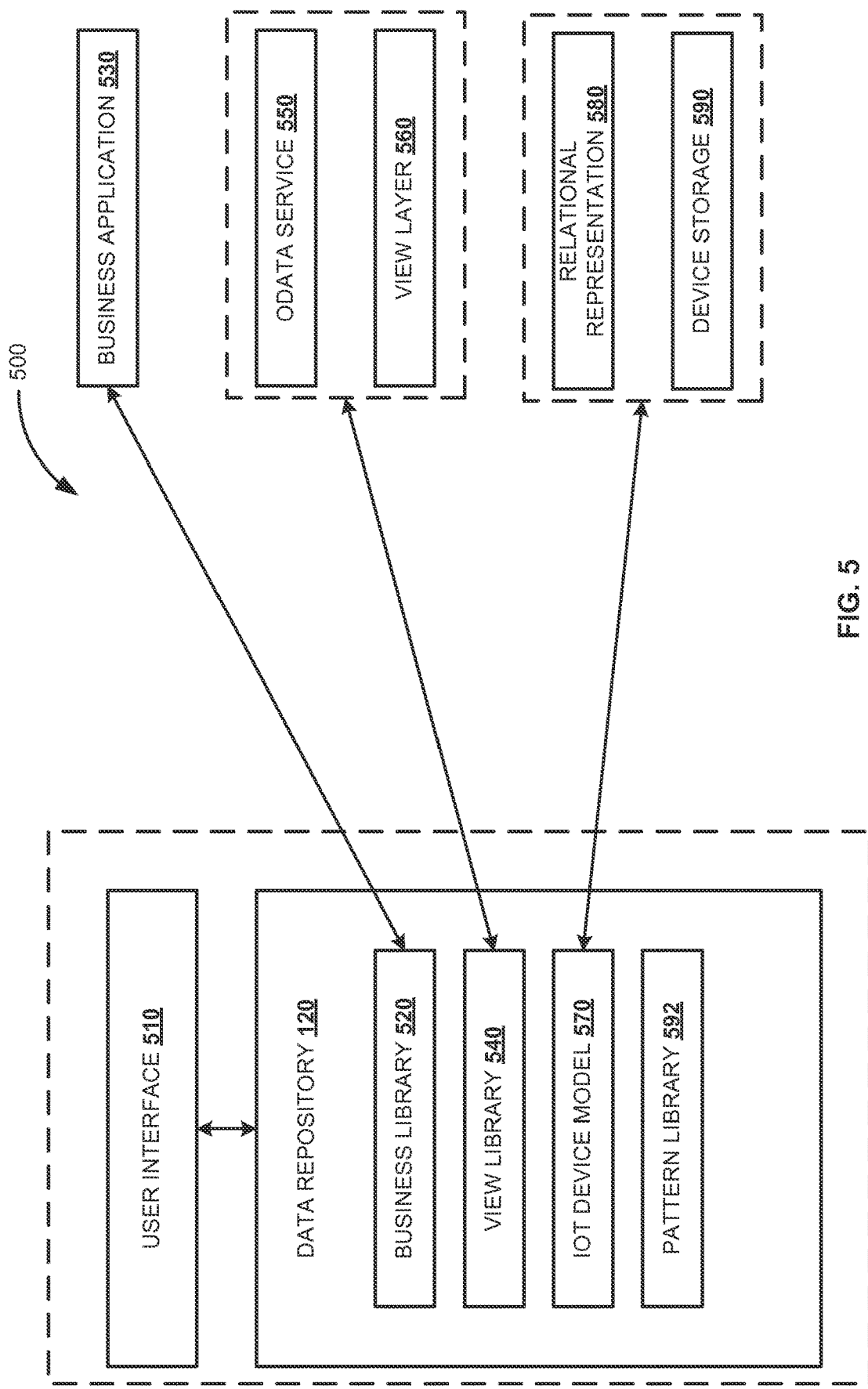
FIG. 5 illustrates an exemplary architectural diagram of data analysis environment related to Internet of Things (IoT), according to an embodiment.

FIG. 5 illustrates an exemplary architectural diagram 500 of data analysis environment (e.g., data analysis environment 100 of FIG. 1) related to Internet of Things (IoT). The IoT data may be analyzed through a user interface 510, e.g., of a handheld device (not shown). In an embodiment, the IoT data may be accessed, stored, edited, and maintained through the user interface 510. The user interface 510 is communicatively connected with the data repository 120. The data repository 120 includes a business library 520, view library 540, and IoT device model 570. The business library 520 stores data related to various business categories (e.g., retail, automobile, etc). The business library 520 may be accessed, modified, updated, and/or maintained through business application 530. The view library 540 stores one or more views related to the IoT data. The view library 540 helps in generating OData (Open Data Protocol) service 550 which defines building and using application programming interfaces (APIs) related to the business. OData service 550 helps to focus on business logic while building the APIs. The view library 540 also helps in generating view layer 560 for creating and manipulating one or inure views related to IoT data. The IoT device model 570 includes various information related to IoT devices. Based upon the IoT device model 570, a relational representation 580 for IoT data may be generated and stored. The IoT device model 570 also helps in retrieving data from IoT devices and storing the retrieved data in a device storage 590. In an embodiment, the data repository 120 also includes a pattern library 592 to stores the one or more predefined patterns.

Figure 6:
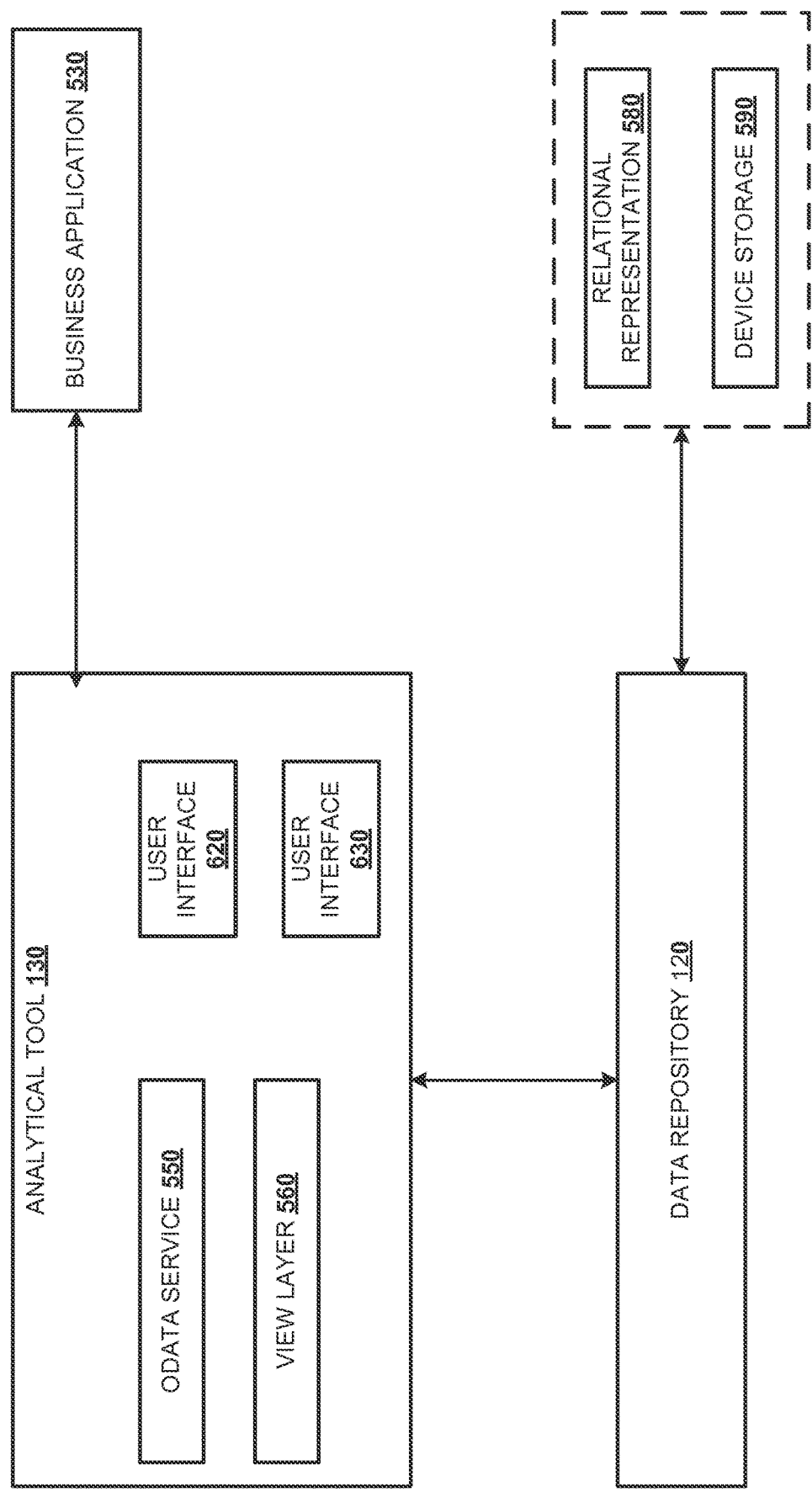
FIG. 6 illustrates an analytical tool to configure data models and generate views based on queries to retrieve data from a data repository, according to an embodiment.

FIG. 6 illustrates the analytical tool 130 (FIG. 1) linked to the data repository 120 and the business application 530 (FIG. 5) for maintaining and analyzing IoT data. The analytical tool 130 includes a user interface 620 (e.g., similar to the UI 300 of FIG. 3) to enable user to configure query for retrieving data from the data repository 120. In an embodiment, the data repository 120 is in communication with the relational representation 580 and the device storage 590 to retrieve IoT device related data according to their relational representation. Based upon the configured query, the analytical tool 130 generates the one or more views using the view layer 560. The view layer 560 is triggered to generate the one or more views. Once the views are generated, one or more operations (e.g., logical or arithmetical operations) are applied on the views to generate the output. The generated output may be displayed through a user interface 630 (e.g., similar to the UI 510 of FIG. 5). In an embodiment, the generated views are stored in a view library (e.g., the view library 540 of FIG. 5) of the data repository 120. In an embodiment, the analytical tool 130 helps in generating APIs using business application 530 (FIG. 5). The analytical tool 130 also includes the OData service 550 (FIG. 5) to help the user to focus on the business logic while generating the APIs.

Figure 7:
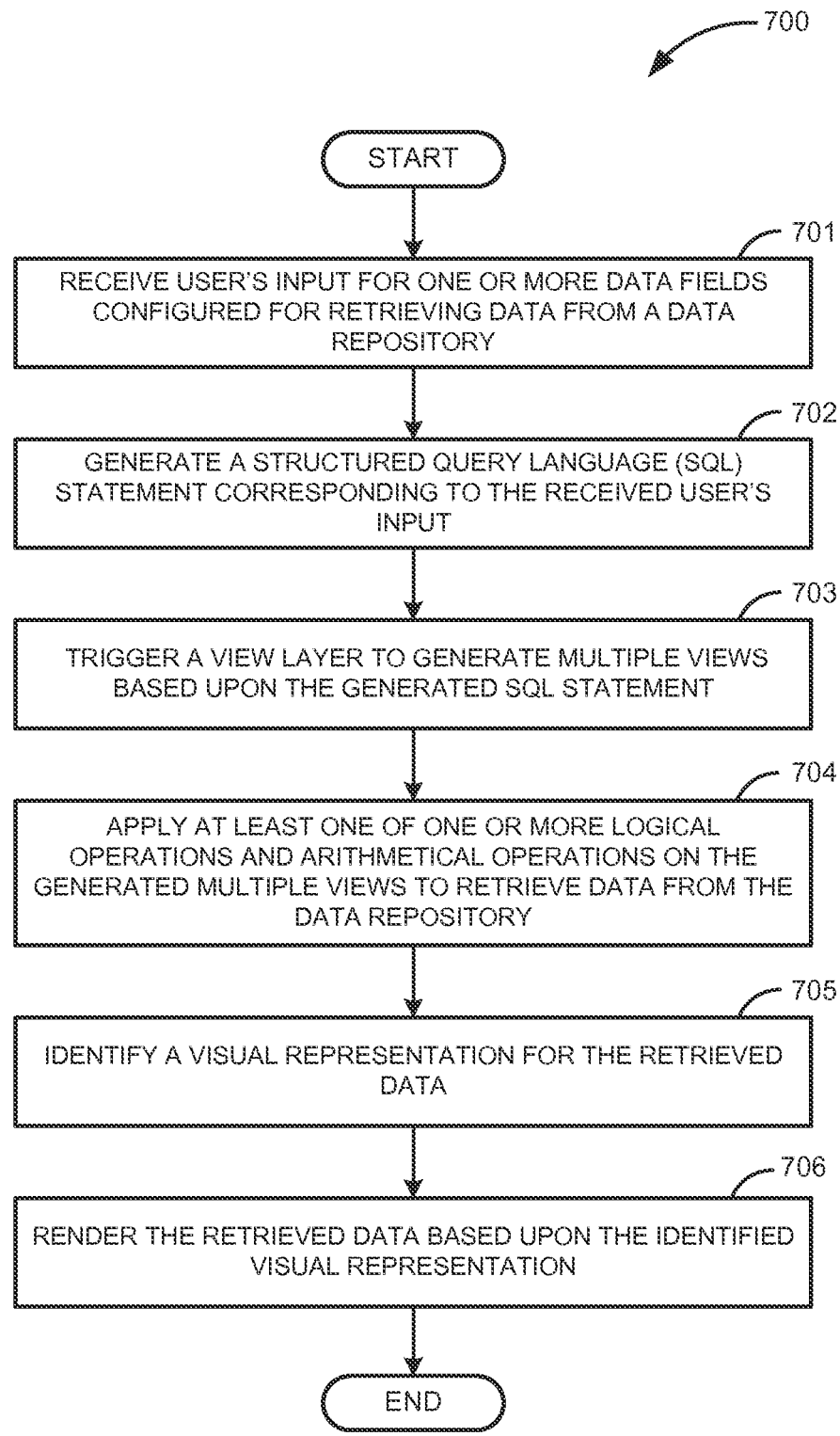
FIG. 7 is a flowchart illustrating a process of retrieving and analyzing data related to Internet of Things (IoT), according to an embodiment.

FIG. 7 is a flowchart illustrating process 700 to monitor and analyze Internet of Things (e.g., IoT 110 of FIG. 1) comprising one or more devices (e.g., devices 101-103 of FIG. 1). The devices include one or more sensors to collect and transfer the collected data to a data repository (e.g., data repository 120 of FIG. 1). The data may be transferred in real time. A user may specify the data to be collected from the sensors (e.g., by defining data models and the data repository). The data repository is communicatively connected to an analytical tool (e.g., analytical tool 130 of FIG. 1). At 701, through a user interface (e.g., user interface 300 of FIG. 3) of the analytical tool, user's input for one or more data fields (e.g., data fields 310-340 of FIG. 3) is received for retrieving desired data from the data repository. At 702, a structured query language (SQL) statement corresponding to the received user's input is generated. At 703, a view layer is triggered to generate multiple views based upon the generated SQL statement. At 704, one or more logical and/or arithmetical operations are applied on the generated multiple views to retrieve data from the data repository. At 705, a visual representation for the retrieved data is identified. The visual representation is identified from user's input corresponding to a data field (e.g., visualization 340 of FIG. 3) of the one or more data fields (e.g., data fields 310-340 of FIG. 3). At 706, the retrieved data is rendered or displayed based upon the identified visual representation.

Embodiments enable users (e.g., customers or end users) to design, create, modify, or update data models based upon their dynamic requirements. The users can select the device (s) and data field(s) for which the data is to be collected or retrieved. Embodiments also enable the users to easily retrieve the required data from the created data models without acquiring expertise training or knowledge on retrieving data. The users can also specify the format in which the required output or data is to be displayed, such as pie chart, Venn diagram, tabular format, number, etc. In various embodiments, multiple views are created for retrieving the required data from the created data models. When multiple views are created, the mathematical and/or logical operations are performed in parallel to retrieve the required data which makes the system more efficient and fast.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, Of some other configuration. The clients can vary in complexity from mobile and handheld devices, to thin clients and on to thick clients or even other servers.

The above-illustrated software components are tangibly stored on a computer readable storage medium as instructions. The term "computer readable storage medium" includes a single medium or multiple media that stores one or more sets of instructions. The term "computer readable storage medium" includes physical article that is capable of undergoing a set of physical changes to physically store, encode, or otherwise carry a set of instructions for execution by a computer system which causes the computer system to perform the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language a d development tools. Another embodiment may be implemented in hard-wired circuitry in place of, or in combination with machine readable software instructions.

Figure 8:
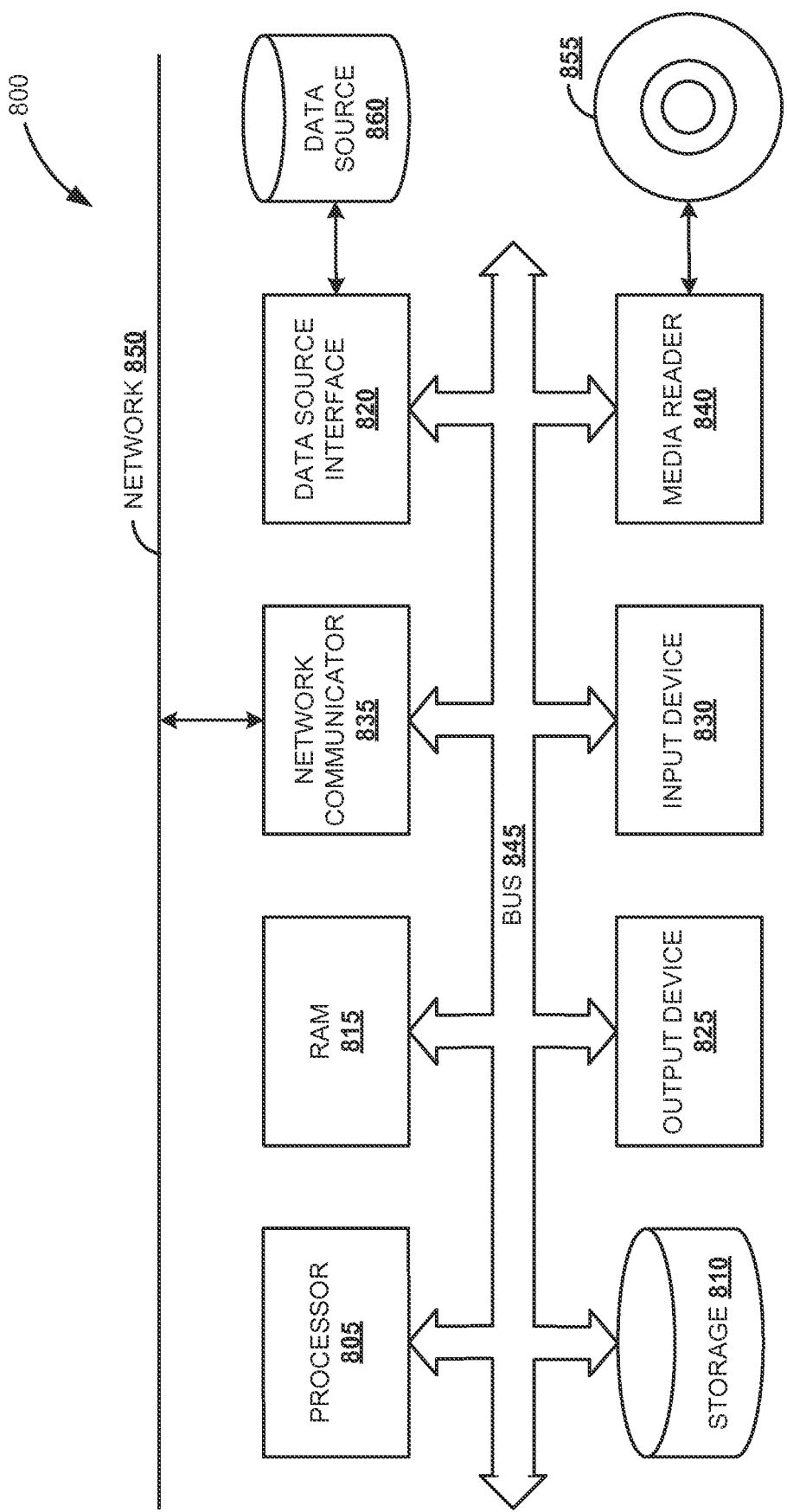
FIG. 8 is a block diagram illustrating an exemplary compute system, according to an embodiment.

FIG. 8 is a block diagram of an exemplary computer system 800. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. The output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Database Connectivity (ODBC), produced by an underlying software system, e.g., an enterprise resource planning (ERP) system, and the like. Data sources may also include a data source where the data is not tangibly stored or otherwise ephemeral such as data streams, broadcast data, and the like. These data Sources can include associated data foundations, semantic layers, management systems, security systems and so on.

In the above description, numerous specific details are set forth to provide a thorough understanding of embodiments. One skilled in the relevant art will recognize, however that the one or more embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of and examples for, the embodiment are described herein for illustrative purposes, various equivalent modifications are possible within the scope of the embodiments, as those skilled in the relevant art will recognize. These modifications can be made to the embodiments in light of the above detailed description. Rather, the scope of the one or More embodiments is to be determined by the following claims, which are to be interpreted in accordance with established doctrines of claim construction.

What is claimed is:

1. A computer-implemented method for analyzing time-stamped internet of things (IoT) data, the method comprising:
    through a user interface (UI), receiving a user input for one or more data fields including one or more conditions prerequisite to retrieval of the time-stamped IoT data from a data repository;
    converting the received user input into a structured query language (SQL) query;
    generating multiple views based upon the generated SQL query without modifying the data repository;
    performing logical operations and arithmetical operations in parallel on the generated multiple views to determine whether the one or more conditions are satisfied, wherein each view of the multiple views is a result set of the generated SQL query;
    retrieving the time-stamped IoT data from the data repository if it is determined that the one or more conditions are satisfied;
    based upon the received user input for the one or more data fields, identifying a visual representation including a format for rendering the retrieved time-stamped IoT data; and
    rendering the retrieved time-stamped IoT data based upon the identified visual representation.

2. The computer readable medium of claim 1, wherein the data repository stores the time-stamped IoT data related to one or more devices comprising internet of things (IoT) and wherein the generated multiple views are stored in a view library of the data repository.

3. The computer readable medium of claim 2, wherein the one or more devices is selected by the user and wherein the one or more devices include one or more sensors in communication with the data repository.

4. The computer readable medium of claim 2, wherein the time-stamped IoT data is received from the one or more devices in real time or a predefined time interval and wherein the received time-stamped IoT data is stored in the data repository.

5. The computer readable medium of claim 2, wherein the time-stamped IoT data further comprises geo location stamped data.

6. The computer readable medium of claim 1, wherein visual representation comprises one of a Venn diagram, a pie chart, a table, and a graph.

7. The computer readable medium of claim 1, wherein the one or more data fields comprises: a pattern field, an object field, a property field, and a visualization field.

8. The computer readable medium of claim 7, wherein the object field represents a device which is to be analyzed, the property field represents a property of the device which is to be analyzed, the pattern field represents a feature of the property to be analyzed, and the visualization field represents a template in which pattern is to be displayed on the user interface.

9. The computer readable medium of claim 8, wherein a value in the pattern field is selected through a drop down menu including one or more predefined patterns.

10. The computer readable medium of claim 1, wherein based upon the received input for one or more data fields, a query is generated in a natural language and the structured query language (SQL) statement is generated corresponding to the generated query.

11. The computer-implemented method of claim 1, wherein each of the multiple views comprises a result set of a database query.

12. A computer-implemented method for analyzing time-stamped internet of things (IoT) data, the method comprising:
    through a user interface (UI), receiving a user input for one or more data fields including one or more conditions configured for retrieving the time-stamped IoT data from a data repository;
    converting the received user input into a structured query language (SQL) query;
    generating multiple views based upon the generated SQL query without modifying the data repository;
    performing logical operations and arithmetical operations in parallel on the generated multiple views to determine whether the one or more conditions are satisfied, wherein each view of the multiple views is a result set of the generated SQL query;
    retrieving the time-stamped IoT data from the data repository when the one or more conditions are satisfied;
    based upon the received user input for the one or more data fields, identifying a visual representation including a format for rendering the retrieved time-stamped IoT data; and
    rendering the retrieved time-stamped IoT data based upon the identified visual representation.

13. The computer-implemented method of claim 12 further comprising:
    identifying one or more devices comprising the IoT;
    receiving data related to the identified one or more devices; and
    storing the received time-stamped IoT data in the data repository.

14. A computer system for analyzing time-stamped internet of things (IoT) data, the system comprising:
    at least one memory to store executable instructions; and
    at least one processor communicatively coupled to the at least one memory, the at least one processor configured to execute the executable instructions to:
        through a user interface (UI), receive a user input for one or more data fields including one or more conditions configured for retrieving time-stamped IoT data from a data repository;
        convert the received user input into a structured query language (SQL) query;
        generate multiple views based upon the generated SQL query without modifying the data repository;
        perform logical operations and arithmetical operations in parallel on the generated multiple views to determine whether the one or more conditions are satisfied, wherein each view of the multiple views is a result set of the generated SQL query;
        retrieve time-stamped IoT data from the data repository when the one or more conditions are satisfied;
        based upon the received user input for the one or more data fields, identify a visual representation including a format for rendering the retrieved time-stamped IoT data; and
        render the retrieved time-stamped IoT data based upon the identified visual representation.

15. The system of claim 14, wherein the processor is further configured to execute the executable instructions to:
    identify one or more devices comprising the IoT;
    receive time-stamped IoT data related to the identified one or more devices; and
    store the received data in the data repository.

16. The system of claim 15, wherein the time-stamped IoT data is received from the one or more devices in real time or a predefined time interval and stored in the data repository.

17. The system of claim 15, wherein the time-stamped IoT data is at least one of a time stamped data and a geo location stamped data.

18. The system of claim 14, wherein the visual representation comprises one of a Venn diagram, a pie chart, a table, and a graph.

19. The system of claim 14, wherein the one or more data fields comprises: a pattern field, an object field, a property field, and a visualization field.

20. The system of claim 19, wherein the object field represents a device which is to be analyzed, the property field represents a property of the device which is to be analyzed, the pattern field represents a feature of the property to be analyzed, and the visualization field represents a template in which pattern is to be displayed on the user interface.

21. The system of claim 20, wherein a value in the pattern field is selected through a drop down menu including one or more predefined patterns.

* * * * *